O. N. KELLY.
COLLAR FASTENER OR CLASP.
APPLICATION FILED AUG. 9, 1920.
1,382,515. Patented June 21, 1921.
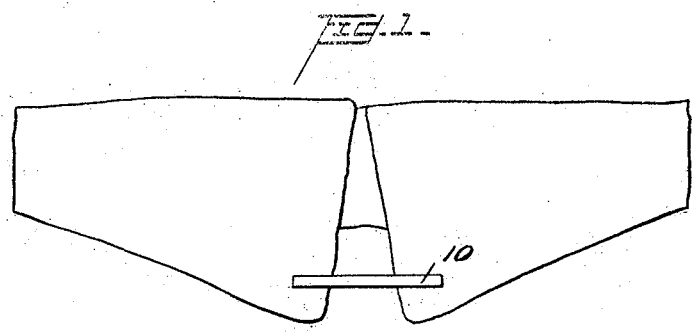
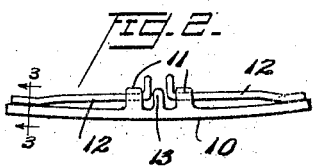
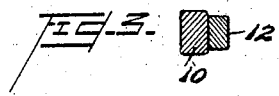
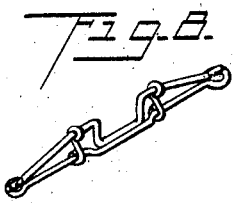
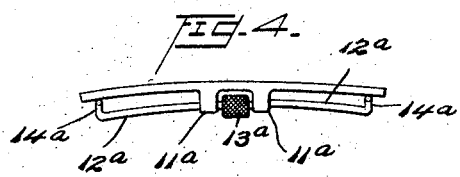
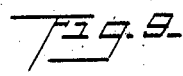
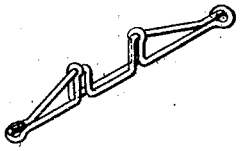
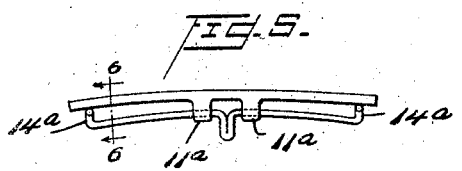
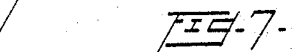
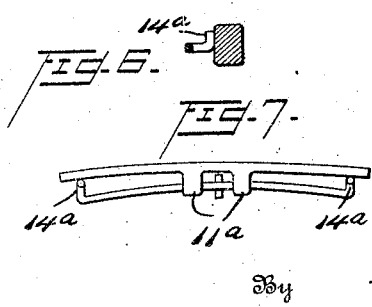
Orson N. Kelly
Inventor
By Abm D Shoemaker
Attorney

UNITED STATES PATENT OFFICE.

ORSON N. KELLY, OF DALLAS, TEXAS.

COLLAR FASTENER OR CLASP.

1,382,515.  Specification of Letters Patent.  Patented June 21, 1921.

Application filed August 9, 1920. Serial No. 402,463.

*To all whom it may concern:*

Be it known that I, ORSON N. KELLY, a citizen of the United States, residing at Dallas, in the county of Dallas and State of Texas, have invented certain new and useful Improvements in Collar Fasteners or Clasps, of which the following is a specification.

This invention relates to a collar fastener or clasp, and the particular adaptation selected for illustration is the connecting together of the opposite edges or flaps of a soft collar.

It has for its object the provision of a collar fastener which will hold the flaps of a collar properly spaced from each other and to securely grip the flaps so that a neat appearance of the collar will be maintained. Another object is the provision of such a fastener in which the gripping means will be hidden from view, and into which the flaps of the collar may be easily inserted and efficiently held. A still further object of the invention is the provision of a fastener which may be used with collars of varying thicknesses of material without impairing its efficiency.

Other objects and advantages of the invention will hereinafter appear in the following description, and the novel features thereof will be particularly pointed out in the appended claims.

In the drawings, Figure 1 is a view showing the fastener applied to a collar, Fig. 2 is a top plan of one form of the invention, Fig. 3 is a section through the clamping ends on the line 3—3 of Fig. 2, Figs. 4 and 5 are plans of other forms of the invention, Fig. 6 is a section on the line 6—6 of Fig. 5, Fig. 7 is a plan view of still another form of the invention, and Figs. 8 and 9 are perspectives of two modified forms of the invention in which the fastener is made entirely of wire stock.

Like letters of reference indicate like parts throughout the several figures of the drawing.

The numeral 10 indicates the body portion of the fastener, which is provided upon its rear face with a pair of apertured lugs 11, 11, forming bearings for clamping members 12, 12. The said lugs are sufficiently wide to securely hold the clamping members in substantially rigid position. A stop lug 13 is provided between the apertured lugs.

The clamping member is made of a piece of stiff wire, which for a portion of its length is in substantial parallelism with the body portion of the fastener. At the outer ends the clamping members are provided with an offset portion which coöperates with the end portion of the body to clamp the fabric of the collar flap. This offset in its simplest form is made by forming a double bend in the end of the wire, leaving the clamping end in a line parallel with the end portion of the body member.

At the opposite end of the clamping member is a substantially right angle bend, which lies adjacent and between the lugs 11, this portion of the clamping member acting as a lever for turning it upon its axis to bring the clamping end into clamping relation with the end of the body portion. The two lever portions are sufficiently close to the stop lug 13 to prevent any undue shifting of the clamping members within the supporting lugs 11. In this form of the invention the clamping members are capable of operation independently of each other, but it will be understood that they may be connected in any suitable manner so as to be operated in unison.

In the form of the invention shown in Fig. 4 the body portion is provided with the lugs 11ª, but the said lugs are spaced somewhat farther apart. Between these lugs, which are provided with bearing apertures is a roller or handhold 13ª of any suitable cross section, the surface of which is roughened so as to provide easy manipulation with the fingers. In the ends of this handhold are secured the ends of the clamping wire members 12ª, so that upon a turning of the handhold the clamping members will be brought into action. At the ends of the clamping members in this form of the invention the wire is bent at an angle and then bent or curved to form the clamping end 14ª as shown. Upon a turning of the handhold in one direction the clamping end of the wire will be brought into clamping relation with the end of the body portion of the fastener to clamp the collar flap, while a turning in the opposite direction will release said gripping or clamping action.

In Figs. 5 and 7 are shown two modified forms of the clamping member. In Fig. 5 this member is formed from a single piece of wire bent at its central portion to form a lever by means of which the clamping member will be turned upon its axis. In Fig. 7 the clamping member is made substantially straight throughout its length and provided at its central portion between the supporting lugs with a pin. The pin is securely fastened to the clamping member in any suitable manner, either by passing the wire through the pin or by flattening the wire at this point and passing the pin through an aperture provided in the flattened portion.

While I have shown and described my invention in connection with a fastener for the flaps of soft collars, it may nevertheless be used to fasten other objects, as for instance, shirt sleeves or other articles of dress or wearing apparel. Any ornamental design may be placed upon that portion of the body member which is exposed to view.

It will be seen that a neat and efficient collar fastener is provided by my invention for the particular adaptation shown, one by which the collar flaps will be held securely and in proper spaced relation. Variations in the structure shall be limited only by the appended claims; for instance, while I have shown parts of my fastener as stamped from metal, hard rubber, celluloid, ivory or other suitable material, it will be understood that all of the parts may be made of wire stock, which will permit its manufacture from gold filled or rolled gold stock, thus leaving no raw edges. When made of wire the lugs may be formed by bending portions of the wire body up into loops forming the bearing apertures through which passes the wire clamping member, as shown in Fig. 9. Or the lugs of the body portion may be formed of separate links of wire, attached securely to the body, and in which links are formed the pivot apertures to receive the clamping member, as shown in Fig. 8. In either case the ends of the wire of the body portion are looped to form broad bearing surfaces for the ends of the clamping members. The handhold of the clamping member may be formed by bending a portion thereof into U-shape, which will lie in its clamped position against that portion of the body between the lugs, as shown in Fig. 9. This portion of the body member thereby forms a stop and may be offset to more effectually coöperate with the handhold, as shown in Fig. 8.

Having described my invention, what I claim as new and desire to secure by Letters Patent is:

1. A collar fastener comprising an oblong body portion, a lug upon the face thereof having a bearing aperture therein, said aperture lying in a line parallel with the longitudinal axis of said body portion, and a clamping member substantially paralleling said body portion, pivoted in said bearing lug and having an offset clamping end coöperating with the end of said body portion to clamp a collar flap.

2. A collar fastener comprising a body portion, lugs thereon having bearing apertures therein, said apertures lying in a line parallel with the longitudinal axis of said body portion, and a clamping member pivotally mounted in said apertures and provided with gripping ends, and means between said lugs for turning said clamping member upon its pivot.

3. A collar fastener comprising a body portion, lugs thereon provided with alined apertures, clamping members mounted in said apertures made of wire and provided with offset clamping ends and with means between said lugs for turning the clamping members upon their pivot to bring said offset clamping ends into clamping relation with the ends of the body portion.

In testimony whereof I affix my signature.

ORSON N. KELLY.